(12) United States Patent
Chen

(10) Patent No.: US 12,071,198 B2
(45) Date of Patent: Aug. 27, 2024

(54) SCOOTER

(71) Applicant: SHANGHAI CHANGYI MACHINERY MANUFACTURE CO., LTD., Shanghai (CN)

(72) Inventor: Bang Chen, Shanghai (CN)

(73) Assignee: SHANGHAI CHANGYI MACHINERY MANUFACTURE CO., LTD., Shanghai (CN)

( * ) Notice: Subject to any disclaimer, the term of this patent is extended or adjusted under 35 U.S.C. 154(b) by 375 days.

(21) Appl. No.: 17/427,102

(22) PCT Filed: Nov. 5, 2020

(86) PCT No.: PCT/CN2020/126688
§ 371 (c)(1),
(2) Date: Jul. 30, 2021

(87) PCT Pub. No.: WO2021/098523
PCT Pub. Date: May 27, 2021

(65) Prior Publication Data
US 2022/0119072 A1    Apr. 21, 2022

(30) Foreign Application Priority Data
Nov. 20, 2019   (CN) .......................... 201922019511.9

(51) Int. Cl.
*B62M 1/28*   (2013.01)
*B62K 5/05*   (2013.01)
(Continued)

(52) U.S. Cl.
CPC ................. *B62M 1/28* (2013.01); *B62K 5/05* (2013.01); *B62K 5/08* (2013.01); *B62K 21/16* (2013.01); *B62M 1/10* (2013.01); *B62K 21/08* (2013.01)

(58) Field of Classification Search
CPC .. B62M 1/28; B62M 1/10; B62K 5/05; B62K 5/08; B62K 21/16; B62K 21/08; B62K 3/002
See application file for complete search history.

(56) References Cited

U.S. PATENT DOCUMENTS

| | | | |
|---|---|---|---|
| 8,696,000 B1 * | 4/2014 | Chen ...................... | B62K 3/002 280/87.041 |
| 10,486,765 B2 * | 11/2019 | McGowan ............. | B62K 3/002 |

(Continued)

FOREIGN PATENT DOCUMENTS

| | | |
|---|---|---|
| CN | 201427644 Y | 3/2010 |
| CN | 204457055 U  * | 7/2015 |

(Continued)

OTHER PUBLICATIONS

Translation of He (CN 204457055 U). (Year: 2015).*

*Primary Examiner* — James A Shriver, II
*Assistant Examiner* — Nicholas R. Kandas
(74) *Attorney, Agent, or Firm* — Bayramoglu Law Offices LLC

(57) ABSTRACT

A dual-pedal driven scooter includes a frame having a front end and a rear end. Front wheels and a rear wheel that are connected to the frame at the front end and the rear end, respectively. A transmission mechanism is configured to drive the rear wheel to thereby drive the scooter. A pedal is configured to drive the scooter wherein. The transmission mechanism is provided with a transmission rope that links the pedal and the rear wheel. The pedal is fixedly connected to the transmission rope to thereby drive the rear wheel by pulling the transmission rope.

7 Claims, 4 Drawing Sheets

(51) Int. Cl.
*B62K 5/08* (2006.01)
*B62K 21/08* (2006.01)
*B62K 21/16* (2006.01)
*B62M 1/10* (2010.01)

(56) References Cited

U.S. PATENT DOCUMENTS

2010/0187790 A1* 7/2010 Yu
2012/0248731 A1* 10/2012 Li .......................... B62K 3/002
          280/221

FOREIGN PATENT DOCUMENTS

| CN | 205872348 U | 1/2017 |
| CN | 206885235 U | 1/2018 |
| CN | 110789647 A | 2/2020 |
| CN | 305776095 S | 5/2020 |
| CN | 211442624 U | 9/2020 |
| EP | 2695804 A2 | 2/2014 |

* cited by examiner

SCOOTER

CROSS REFERENCE TO THE RELATED APPLICATIONS

This application is the national phase entry of International Application No. PCT/CN2020/126688, filed on Nov. 5, 2020, which is based upon and claims priority to Chinese Patent Application No. 201922019511.9, filed on Nov. 20, 2019, the entire contents of which are incorporated herein by reference.

TECHNICAL FIELD

The present invention relates to a scooter, and in particular relates to a scooter having a pedal distributed above a frame, and driven forward by a user's feet alternately stepping on the pedal.

BACKGROUND

The scooter is a commonly used transportation device, which has the advantages of portability, simple structure, and easy parking. The traditional scooter with a simple structure is driven in a manner of pushing a footboard, in which the user can stand on the footboard of the scooter with one foot and push the scooter with the other foot.

A novel scooter may include a transmission, so that the transmission can provide power for pushing the scooter forward by alternately moving the center of gravity under the control of a user, such as a scooter disclosed in Chinese patent No. ZL201620730193. However, this type of scooter generally has a relatively high center of gravity, which is difficult to balance, and rises a risk of riding.

SUMMARY

The technical problem to be solved by the present invention is that the existing scooter with a drive system has a high center of gravity and is difficult to balance.

In order to solve the above technical problem, the technical solutions of the present invention provide a scooter, including: a frame, a handlebar, a vertical tube assembly, a pedal, a transmission mechanism and a steering mechanism. The pedal is mounted on the frame, and the pedal is connected to the frame through a pivot horizontally provided on the frame. Front wheels and a rear wheel are mounted on the frame. The front wheels include a left front wheel and a right front wheel. The vertical tube assembly is mounted at a front end of the frame. The handlebar is mounted on the vertical tube assembly. The pedal drives the front wheels and the rear wheel to rotate by the transmission mechanism. The steering mechanism is mounted at the front end of the frame.

Preferably, the transmission mechanism includes a transmission rope fixedly connected to a front end and a rear end of the pedal, a first flywheel and a second flywheel located at two ends of a rear axle, a first pulley located at the bottom of the frame, and a second pulley located below the front end of the pedal. One end of the transmission rope connect to the rear end of the pedal and winds by the first flywheel, the first pulley, the second flywheel, and the second pulley in sequence, so as to be connected to the front end of the pedal.

Preferably, the first flywheel and the second flywheel unidirectionally engage with the rear axle.

Preferably, the front wheels are connected to the frame through a front wheel bracket, the rear wheel is connected to the frame through the rear axle, and the left front wheel and the right front wheel are mounted on the front wheel bracket.

Preferably, the steering mechanism includes a connecting block connected to a bottom of the front end of the frame. The connecting block is connected to the front wheel bracket through a shaft. A flexible part is located between the connecting block and the front wheel bracket. The shaft passes through the flexible part.

Preferably, a groove accommodating the flexible part is provided on the front wheel bracket.

Preferably, the vertical tube assembly includes a connector housing and a button mounted on a housing body of the connector housing. An elastic member is installed in the connector housing. The handlebar is connected to the elastic member. A protrusion for clamping the elastic member on the housing body of the connector housing is mounted at one end of the elastic member.

Preferably, the frame includes an upper board and a lower board which are connected.

Preferably, the pedal is a board with two ends upturned.

Compared with the prior art, the advantages of the present invention are as follows.

The first flywheel and the second flywheel of the present invention are assembled on the same axle and are allowed to rotate relative to the axle in only one direction. When the pedal reciprocates on the frame back and forth, the transmission rope can respectively drive the first flywheel and the second flywheel to rotate and further drive the axle and the rear wheel to rotate, thereby converting the swing motion of the pedal into the forward driving force of the scooter. The invention has a three-wheel structure, which is easy to balance, has a low center of gravity, and is flexible to steer. The user can drive the scooter forward without the feet touching the ground, and also can change the angle of the front wheel bracket by changing the center of gravity, so as to change the traveling direction of the scooter. The scooter of the present invention is easier to balance, safer to ride, and more suitable for young children to use, thereby reducing the age limit of users, and improving the security of the users. Furthermore, it is more comfortable and safer in use, and suitable for play and fitness as well as for short-distance riding.

DETAILED DESCRIPTION OF THE EMBODIMENTS

In order to make the present invention more obvious and easy to understand, the preferred embodiments are described in detail below in conjunction with the drawings.

Figure 1:
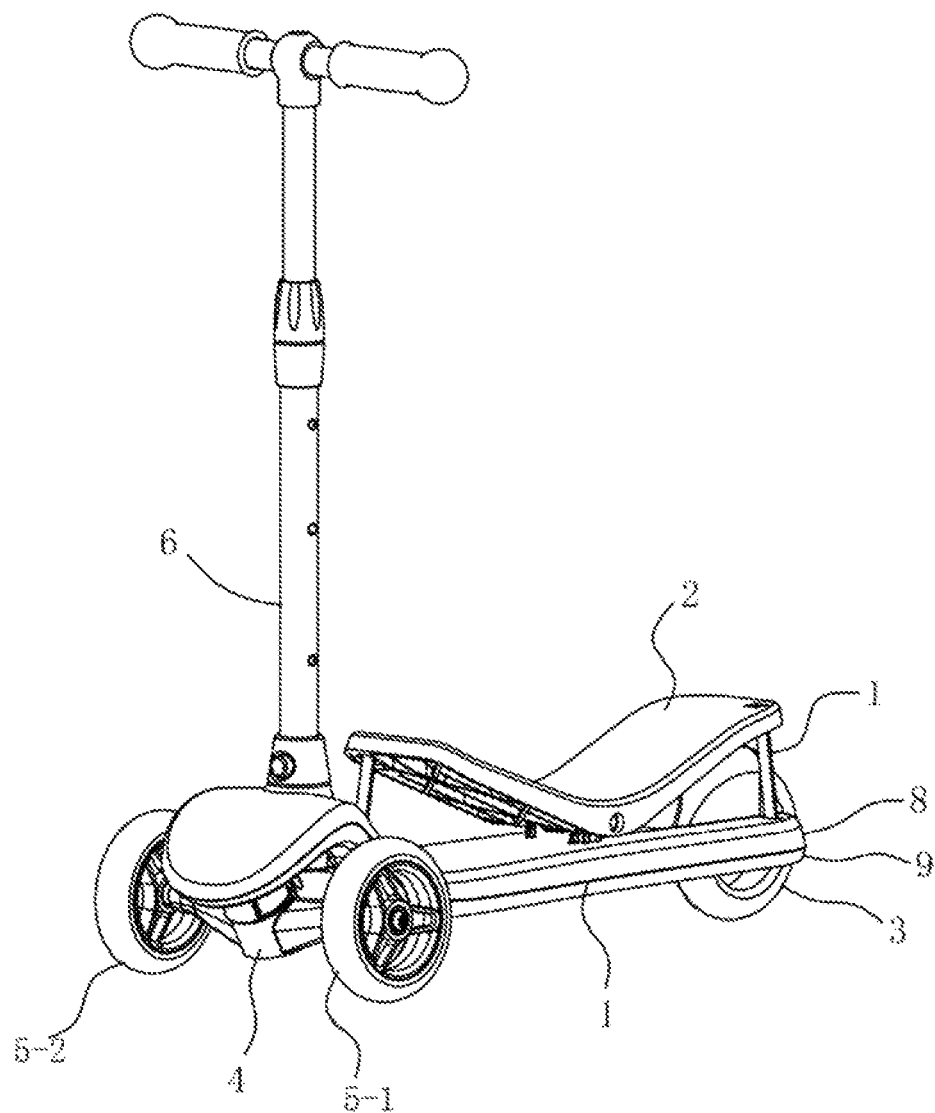
FIG. 1 is a front view of a scooter of the present invention.
Figure 2:
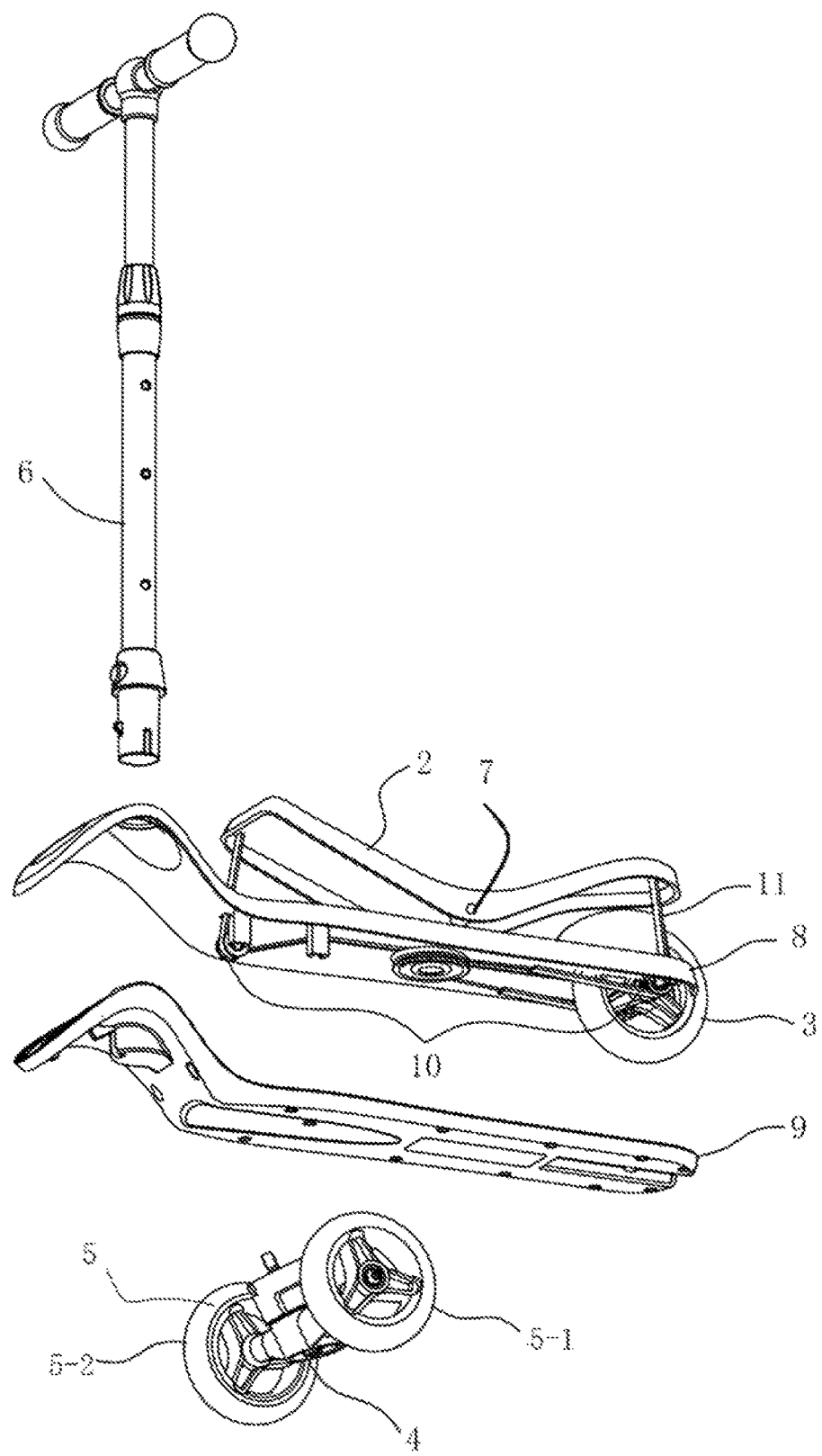
FIG. 2 is an exploded view of the scooter of the present invention.

As shown in FIGS. 1 and 2, a scooter of the present invention includes the frame 1, the pedal 2 rotatably connected to the frame 1, the rear wheel 3 connected to a rear end of the frame 1, the steering mechanism 4 connected to a front end of the frame 1, the front wheels 5 installed on both sides of the steering mechanism 4, the vertical tube assembly 6 installed above the front end of the frame 1, the handlebar 27 installed on the vertical tube assembly 6, and the transmission mechanism 10 configured to drive the rear wheel 3 so as to drive the scooter. The pedal 2 is connected to the pivot 7 of the frame 1. The transmission rope 11 of the transmission mechanism is fixedly connected to two ends of the pedal 2, and the transmission rope 11 is pulled back and forth to drive the rear wheel 3.

Figure 3:
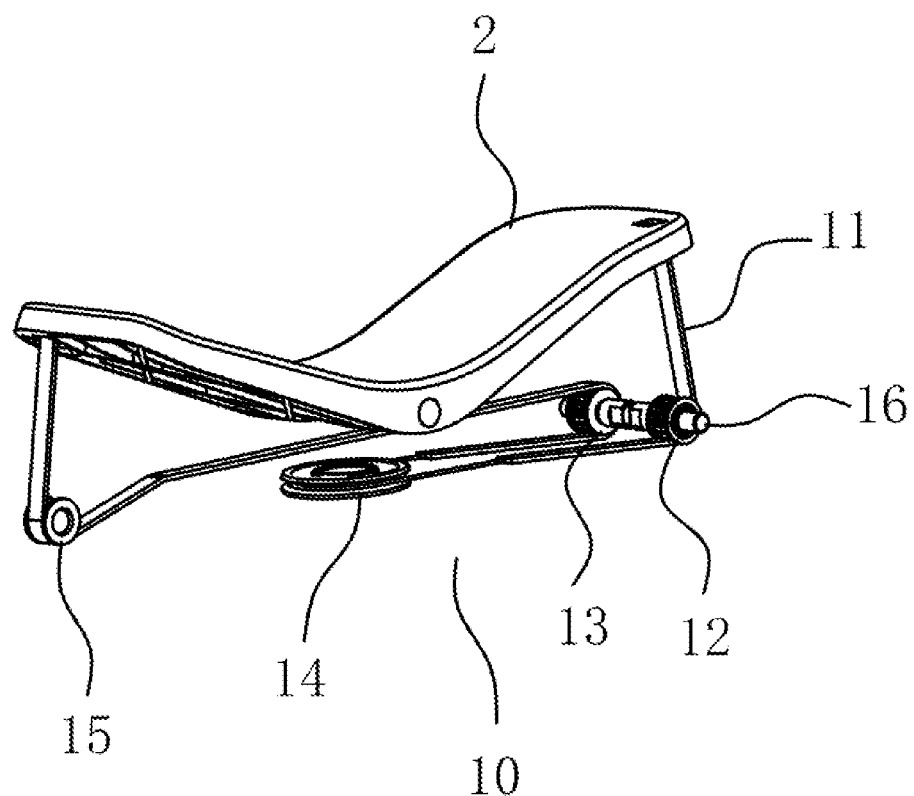
FIG. 3 is a schematic diagram of a transmission mechanism of the scooter of the present invention.

As shown in FIG. 3, the transmission mechanism 10 includes: the transmission rope 11, the first flywheel 12, the second flywheel 13, the first pulley 14, the second pulley 15. One end of the transmission rope 11 is connected to a rear end of the pedal 2, the transmission rope 11 winds by the first flywheel 12, the first pulley 14, the second flywheel 13, and the second pulley 15 in sequence, and the other end of the transmission rope 11 is connected to a front end of the pedal 2. The transmission rope 11 may include one section or is composed of multiple sections, and it can be a belt, a chain, a rope, a cable, a steel cord, and the likes used for a drive/transmission mechanism. Different sections of the transmission rope can be used to match/engage with different wheel sets in the transmission mechanism, such as flywheels and pulleys. The rear wheel 3 and the rear axle 16 are fixedly connected. The first flywheel 12 and the second flywheel 13 are installed at both ends of the rear axle 16. The first flywheel 12 and the second flywheel 13 are respectively located on both sides of the rear wheel 3. The first flywheel 12 and the second flywheel 13 are configured to unidirectionally engage with the rear axle 16, such as a form of a ratchet. The frame 1 includes the upper board 8 and the lower board 9. The upper board 8 and the lower board 9 are connected. A cavity is machined at the bottom of the upper board 8, and the cavity is used to fix the first flywheel 12, the first pulley 14, the second flywheel 13, and the second pulley 15.

The operating principle of the transmission mechanism is as follows. When the front end of the pedal 2 drops and the rear end rises, the pedal 2 drives the transmission rope 11 to move, and then the transmission rope 11 drives the first flywheel 12 and the second flywheel 13 to rotate. Since the first flywheel 12 and the second flywheel 13 unidirectionally engage with the rear axle 16, the first flywheel 12 engages with the rear axle 16 at this time to drive the rear axle 16 and the rear wheel 3 to rotate, thereby driving the scooter forward. At the same time, due to the reverse movement of the second flywheel 13, the second flywheel 13 and the rear axle 16 rotate freely. When the front end of the pedal 2 rises and the rear end drops, the pedal 2 drives the transmission rope 11 to move, and then the transmission rope 11 drives the first flywheel 12 and the second flywheel 13 to rotate. At this time, the first flywheel 12 and the rear axle 16 rotate freely, and the second flywheel 13 engages with the rear axle 16 to drive the rear axle 16 and the rear wheel 3 to rotate, thereby driving the scooter forward. With such a reciprocating cycle, the user can drive the scooter forward by alternately applying force with both feet back and forth.

Figure 4:
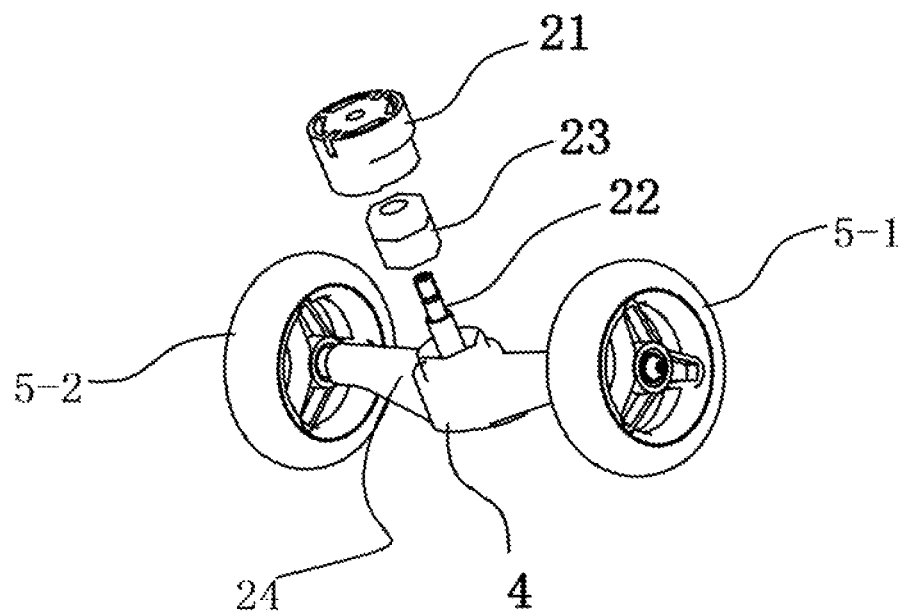
FIG. 4 is a schematic diagram of a steering mechanism of the scooter of the present invention.

As shown in FIG. 4, the steering mechanism includes: the connecting block 21, the shaft 22, the flexible part 23, and the front wheel bracket 24. The shaft 22 in this embodiment is an axis pin. The steering mechanism 4 is installed obliquely below the frame 1. The connecting block 21 is connected to the frame 1. The front wheel bracket 24 is rotatably installed below the connecting block 21. One end of the flexible part 23 is connected to the connecting block 21, and the other end thereof is connected to the front wheel bracket 24. The flexible part 23 is configured to be coaxially connected to the front wheel bracket 24 and the connecting block 21. The shaft 22 passes through holes on the connecting block 21, the front wheel bracket 24 and the flexible part 23. One end of the shaft 22 is connected to the frame 1 and the other end thereof is rotatably connected to the front wheel bracket 24. A groove is machined in the center of the front wheel bracket 24. The other end of the shaft 22 passes through the flexible part 23 to connect to the groove located in the center of the front wheel bracket 24. Further, the flexible part 23 is placed inside the groove. When the user deflects the center of gravity of the frame 1 to the left or right, the flexible part 23 deforms, and the front wheel bracket 24 turns relative to the forward direction of the scooter due to the force generated by the deformation of the flexible part 23 deforms. The front wheel bracket 24 turns to the direction of the larger force generated by the deformation of the flexible part 23.

The operating principle of the steering mechanism is as follows. When the user deflects the center of gravity to the left, the force on the left front wheel 5-1 is greater than that on the right front wheel 5-2. According to the force analysis of the front wheel bracket 24, it can be known that the backward force on the left side of the frame 1 is greater than that on the right side of the frame 1, the front wheel bracket 24 and the front wheels 5 rotate to resist the deformation force of the flexible part 23, and thus, the scooter turns left. Similarly, when the user deflects the center of gravity to the right, the scooter turns right. Since the flexible part 23 is located between the connecting block 21 and the front wheel bracket 24, the flexible part 23 elastically restores to keep the front wheels 5 facing forward when the user's center of gravity is substantially right above. When the user adjusts the center of gravity, the flexible part 23 will act as a buffer to avoid rapid turning. The flexible part 23 can also have a certain shock absorption effect.

Figure 5:
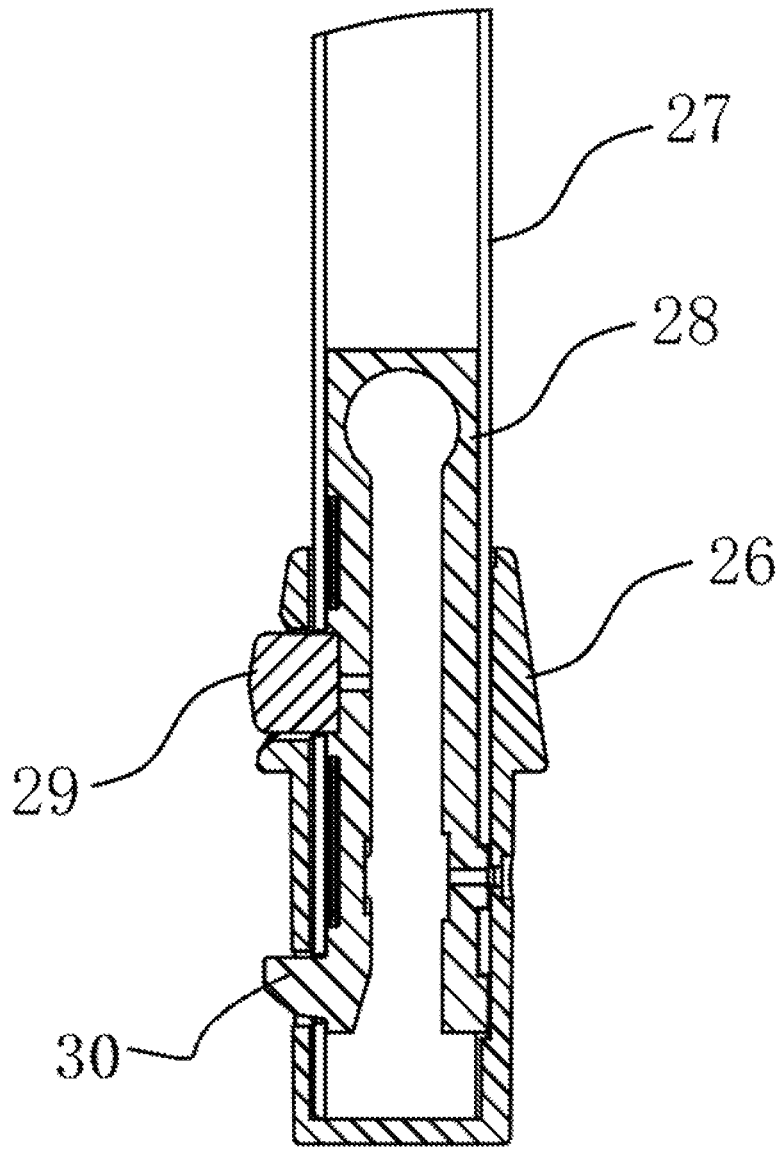
FIG. 5 is a schematic diagram of a vertical tube assembly of the scooter of the present invention.

The handlebar 27 is telescopically connected to the vertical tube assembly 6, and the vertical tube assembly 6 is detachably connected to the front end of the frame 1. As shown in FIG. 5, the vertical tube assembly 6 includes the connector housing 26, and the button 29 installed on a housing body of the connector housing 26. The elastic member 28 is installed in the connector housing 26. The handlebar 27 is connected to the elastic member 28. The elastic member 28 has the protrusion 30 that can shift in response to the movement of the button 29 connected to the elastic member 28. When the button 29 is pressed, the protrusion 30 below the elastic member 28 shrinks into the connector housing 26 and the vertical tube assembly 6 can be inserted into a seat hole provided on the frame 1. At this time, the button 29 is released, the protrusion 30 of the elastic member 28 pops out, and is just clamped on a notch of the connector housing 26, thereby firmly locking the vertical tube assembly 6 on the frame 1. When the button 29 is pressed, the protrusion 30 shifts into the elastic member 28, and the handlebar 27 can be inserted into the vertical tube assembly 6.

What is claimed is:

1. A scooter, comprising: a frame, a handlebar, a vertical tube assembly, a pedal, a transmission mechanism and a steering mechanism, wherein the pedal is provided on the frame,
the pedal is connected to the frame through a pivot horizontally provided on the frame,
front wheels and a rear wheel are provided on the frame,
the front wheels include a left front wheel and a right front wheel,
the vertical tube assembly is installed at a front end of the frame, the handlebar is mounted on the vertical tube assembly,
the pedal drives the front wheels and the rear wheel to rotate by the transmission mechanism,
the steering mechanism is located at the front end of the frame,
the transmission mechanism includes a single continuous transmission rope fixedly connected to a front end and a rear end of the pedal, a first flywheel and a second flywheel installed at two ends of a rear axle, a first pulley located at a bottom of the frame, and a second pulley located below the front end of the pedal, and
one end of the transmission rope is connected to the rear end of the pedal and winds the first flywheel, the first pulley, the second flywheel, and the second pulley in sequence, so as to be connected to the front end of the pedal, wherein the first pulley has an axis of rotation substantially vertically aligned and the second pulley has an axis of rotation substantially horizontally aligned, wherein the frame includes an upper board and a lower board which are connected and wherein the transmission mechanism is disposed between the upper board and the lower board.

2. The scooter according to claim 1, wherein the first flywheel and the second flywheel unidirectionally engage with the rear axle.

3. The scooter according to claim 1, wherein the front wheels are connected to the frame through a front wheel bracket, the rear wheel is connected to the frame through the rear axle, and the left front wheel and the right front wheel are mounted on the front wheel bracket.

4. The scooter according to claim 3, wherein the steering mechanism includes a connecting block connected to a bottom of the front end of the frame,
the connecting block is connected to the front wheel bracket through a shaft,
a flexible part is located between the connecting block and the front wheel bracket, and
the shaft passes through the flexible part.

5. The scooter according to claim 4, wherein a groove for accommodating the flexible part is provided on the front wheel bracket.

6. The scooter according to claim 1, wherein the vertical tube assembly includes a connector housing and a button mounted on a housing body of the connector housing, an elastic member is mounted in the connector housing,
the handlebar is connected to the elastic member, and
a protrusion for clamping the elastic member on the housing body of the connector housing is mounted at one end of the elastic member.

7. The scooter according to claim 1, wherein the pedal is a board with two ends upturned.

* * * * *